3,318,717
RAPID CURING ADHESIVE COMPOSITION FOR BONDING SILICONE RUBBER TO METALLIC SURFACES
Verne G. Simpson, Scotia, N.Y., assignor to General Electric Company, a corporation of New York
No Drawing. Filed Oct. 28, 1963, Ser. No. 319,513
9 Claims. (Cl. 106—287)

This invention relates to adhesive compositions. More particularly, the present invention relates to adhesive compositions comprising the product obtained by mixing an alkenyl tris(organoxy) silane with phosphorous acid.

Many commercial products are made which comprise silicone rubber bonded to a metallic base, such as a ferrous metal base. These composite articles are generally prepared by placing a bonding or adhesive agent on the surface of the metal base, molding a curable silicone rubber compound to the thus treated base at an elevated temperature and then post-curing the resulting composite article at an elevated temperature, such as a temperature of 350° F. for 24 hours, to cure both the silicone rubber and bonding agent. While satisfactory composite articles are prepared by such processes, the post-cure required for the completion of the cure of both the silicone rubber and the bonding layer represents an obvious economic disadvantage.

The economic disadvantage associated with the curing of the silicone rubber in such composite articles (or in any type of article) has been obviated by the silicone rubber compositions described and claimed in my copending application, Ser. No. 227,081, filed Sept. 28, 1962, and assigned to the same assignee as the present invention. The silicone rubber compositions of the aforementioned application are rapidly cured by molding techniques without the necessity of a post-cure, resulting in a product which can be completely cured during a conventional molding cycle, such as molding at a temperature of about 320° F. for a time of about 10 minutes. The compositions of the aforementioned copending application comprise, by weight, 100 parts of a conventional organopolysiloxane such as a polydiorganosiloxane having a viscosity of at least 100,000 centipoises, 10 to 300 parts of a filler, and 0.1 to 10 parts of an olefinically unsaturated organosilicon material, such as vinyltriethoxysilane. My aforementioned copending application is hereby incorporated by reference into the present application for the purpose of describing the various rapidly curing organopolysiloxanes disclosed and claimed therein.

With the advent of fast curing organopolysiloxanes of the type described in my aforementioned copending application, the bonding or adhesive agents available to the art have not been satisfactory in the preparation of composite articles of the type described above containing a metallic base such as ferrous metal base, to which is bonded a silicone rubber. The defects in such prior art bonding compositions are particularly objectionable in the preparation of composite articles which are subject to contact with various lubricating and automotive transmission oils. For example, when attempts are made to prepare automotive automatic transmission seals having a steel base and a silicone rubber layer employing the bonding or adhesive agents of the prior art and using the rapid cure cycle satisfactory for curing of the silicone rubber of my aforementioned copending application, it is found that exposure of the resulting seal to transmission fluid causes failure of the bond between the silicone rubber and the metal base.

It is an object of the present invention to provide an improved bonding agent or adhesive composition for adhering a cured silicone rubber to a substrate.

It is a further object of the present invention to provide an improved rapid curing bonding or adhesive agent useful in the bonding of cured silicone rubber to metallic bases, which bonding agents cure rapidly.

Another object of my invention is to provide an improved bonding agent useful for the bonding of cured silicone rubber to metallic bases to form composite articles having improved resistance to various solvents.

These and other objects of my invention are accomplished by providing a composition comprising the product obtained by mixing an alkenyl tris(organoxy) silane with phosphorous acid ($H_3PO_3$), preferably in the presence of a suitable solvent. While the proportions of the phosphorous acid and the alkenyl tris(organoxy) silane can vary within wide limits, the phosphorous acid is generally employed in an amount equal to from 0.5 to 15 parts, and preferably from 1.0 to 10.0 parts, by weight, per 100 parts by weight of the alkenyl tris(organoxy) silane.

The alkenyl tris(organoxy) silanes employed in the practice of the present invention are generally well known in the art and comprise compositions having the formula:

(1) $$RSi(OR')_3$$

where R is an alkenyl radical and R' is a member selected from the class consisting of monovalent hydrocarbon radicals and substituted monovalent hydrocarbon radicals. Illustrative of the radicals represented by R in Formula 1 are vinyl, allyl, cyclohexenyl, etc. radicals. Preferably, the R radical is a vinyl radical. Illustrative of the monovalent hydrocarbon radicals and substituted monovalent hydrocarbon radicals represented by R' of Formula 1 are, for example, alkyl radicals, e.g., methyl, ethyl, propyl, butyl, octyl, etc. radicals; aryl radicals, e.g., phenyl, naphthyl, tolyl, xylyl, etc. radicals; aralkyl radicals, e.g., benzyl, phenylethyl, etc. radicals; alkenyl radicals, e.g., vinyl, allyl, cyclohexenyl, etc. radicals; cycloalkyl radicals, e.g., cyclohexyl, cycloheptyl, etc. radicals; halogen-substituted monovalent hydrocarbon radicals such as, for example, chloromethyl, chloroethyl, dibromophenyl, etc. radicals, as well as hydrocarbonoxy-substituted hydrocarbon radicals having the formula —R"OR'", where R" is a divalent alkylene radical or divalent arylene radicals, such as, for example, methylene, ethylene, p-phenylene, etc. radicals and R'" is a monovalent hydrocarbon radical of the type previously described for R'. Of particular importance in the present invention are compositions within the scope of Formula 1 where R' represents an ethyl radical or a methoxyethyl radical.

Illustrative of specific alkenyl tris(organoxy) silanes within the scope of Formula 1 are, for example, vinyltriethoxysilane, vinyltrimethoxysilane, vinyltriphenoxysilane, vinyl tris(2-methoxyethoxy) silane, vinyl tris(phenoxyphenyl) silane, vinyl tris(methoxymethoxy) silane, vinyl tris(phenoxymethoxy) silane, as well as all of the analogs of the compounds mentioned above wherein the vinyl group is replaced by either an allyl radical or some other alkenyl radical, such as a cyclohexenyl radical. Of particular interest in this regard are compounds such as allyltriethoxysilane and cyclohexenyltriethoxysilane.

The compositions of the present invention are unique in that the presence of both the silane within the scope of Formula 1 and the phosphorous acid are required. Thus, when an attempt is made to substitute an alkyl or phenyl tris(organoxy) silane for the silane of Formula 1, the resulting composition is inoperative as a rapidly curing primer for metal surfaces to which are to be attached cured silicone rubber. As a specific example, the substitution of methyltriethoxysilane for vinyltriethoxysilane results in a composition which will not act as a satisfactory primer. Likewise, the substitution of an acidic material for the phosphorous acid of the present invention results in a material different in kind from that of the present invention. For example, when sulfuric acid is used in place of phosphorous acid to form a primer composition, the resulting material is unstable in the presence of hydrocarbon solvents. Likewise, when phosphoric acid is substituted for the phosphorous acid, no significant amount of bonding between a metallic surface and a silicone rubber is obtained. Similarly, when maleic acid is substituted for the phosphorous acid of the present invention, an unsatisfactory material is obtained.

While the essential components of the composition of this invention have been described, it should be understood that certain modifications of the composition are possible and often desirable so long as the resulting compositions still contain the two essential ingredients heretofore mentioned. One very desirable modifications of the compositions of the present invention is the incorporation of a solvent for both the alkenyl tris(organoxy) silane and the phosphorous acid.

Many conventional solvents are suitable for use as modifying agents, the only requirement being that these materials actually perform their function as solvents and show no adverse affect with respect to the performance of the curing agent. As a practical matter, any conventional solvent which dissolves the reactants has been found to perform satisfactorily. Among the more useful types of solvents are alkanols, halogenated alkanes and esters. Included among the satisfactory alkanols can be mentioned, for example, methanol, ethanol, n-propanol, isopropanol, isobutanol, etc. Satisfactory halogenated alkanes include perchloroethylene, 1,1,1-trichloroethane, etc. Among the satisfactory esters can be mentioned, for example, butyl acetate, methyl propionate, ethyl acetate, etc. The principal characteristics of the solvents described above is that each of the solvents is polar in nature, which appears to be a requirement for a solvent which will function as such for the compositions of the present invention. The amount of solvent employed in preparing the compositions of the present invention may vary within extremely wide limits with the amount of solvent being generally the minimum amount required for complete solution of both the phosphorous acid and the alkenyl tris(organoxy) silane compound where solubility is a problem. In general, the solvent is employed in amounts from about 100 parts to 2,000 parts by weight, based on 100 parts by weight of the mixture of the alkenyl tris(organoxy) silane and the phosphorous acid.

A still further useful modification of the compositions of the present invention is the replacement of a portion of the alkenyl tris(organoxy) silane with an alkyl orthosilicate or a hydroxyalkyl orthosilicate of a partial hydrolyzate thereof. As is well known in the art, these alkyl orthosilicates and hydroxyalkyl orthosilicates have the formula:

(2) 

where Y is a member selected from the class consisting of alkyl radicals, preferably lower alkyl radicals, and hydroxyalkyl radicals, preferably lower hydroxyalkyl radicals. Illustrative of the radicals represented by Y in Formula 2 are, for example, methyl, ethyl, propyl, butyl, octyl, etc. radicals, hydroxymethyl, hydroxyethyl, hydroxybutyl, etc. radicals. One of the preferred alkyl orthosilicates within the scope of Formula 2 is ethyl orthosilicate.

The partial hydrolyzates of the alkyl orthosilicates within the scope of Formula 2 are also well known in the art and many of these materials are commercially available, such as, for example, the material sold under the name Ethyl Silicate 40 by Union Carbide Corporation, which is a mixture of ethylpolysilicates having about 40% available silica and which is derived from the controlled hydrolysis of tetraethyl silicate. Where an orthosilicate or hydrolysis product thereof within the scope of Formula 2 is used to replace a portion of the alkenyl tris(organoxy) silane of Formula 1, it is preferred that the alkyl orthosilicate be present in an amount no greater than about 9 parts of the orthosilicate per part of the silane. When the silane is completely replaced with the ethyl orthosilicate or other alkyl orthosilicate, it is found very difficult to secure an oil-resistant bond between a silicone rubber overcoat and the metallic base to which the overcoat is bonded.

Where the composition includes both a solvent and an orthosilicate or hydrolysis product thereof as described by Formula 2, the compositions of the present invention can be defined as comprising, on a weight basis, (A) 100 parts of a mixture of an alkenyl tris(organoxy) silane within the scope of Formula 1 and an alkyl or hydroxyalkyl orthosilicate or partial hydrolyzate thereof within the scope of Formula 2, with said silane comprising at least 10% and preferably from 20 to 80% by weight of the total weight of (A), (B) from 100 to 2,000 parts of solvent, and (C) from 0.5 to 15 parts of phosphorous acid.

The compositions within the scope of the present invention which comprise as essential ingredients the silane within the scope of Formula 1 and phosphorous acid as well as the alternate ingredients mentioned above are prepared by merely mixing the desired ingredients at room temperature. After mixing, the compositions of the present invention are ready for use (sometimes with dilution prior to use) as primers for metal surfaces. The compositions are stable for many months in closed containers, after which time they are still satisfactory for use.

In applying the compositions of the present invention to a metal surface to be primed, any of the conventional techniques may be employed. Thus, the primer may be applied to the surface by dipping, painting, spraying and the like. In general, the primer solution concentration and method of application are selected so as to provide a thin film of primer on the surface of the metal after the application of the composition of the present invention and the drying thereof. Suitable solutions contain from 50 to 95% solvent at time of application. The thickness of the film is generally of the order of a few microns up to a few tenths of a mil. However, the thickness of the film is not critical so long as the film is uniform. A person skilled in the art would have little difficulty in forming a uniform film on a clean metal surface. Drying of the film can be effected by merely allowing the coated metal surface to sit in the air for a few minutes or hours, depending upon the temperature and solvent, during which time the solvent evaporates and a hard, solid film is formed on the surface of the metal. Alternatively, heat can be used to facilitate and expedite the removal of solvent and the formation of a film of primer on the metal surface. Except for increasing the speed at which the final film is formed, no advantage is found from heating the compositions of the present invention to produce the primed surface. Where heating is used, heating times up to about 4 hours at temperatures up to about 250° C. can be used without any adverse effect.

The time benefit mentioned above from the use of elevated temperatures in forming the primer coating of the present invention is a key to the principal benefit of the primer of the present invention, which benefit is the rapid formation of a primer coat which forms a satisfactory bond between the metal surface and a coating of a rapidly curing organopolysiloxane elastomer.

Regardless of the method employed in forming the film of primer on the metallic article to be coated, the final composite articles of a metallic base and an organopolysiloxane elastomer attached to such base through the primer coating is formed by applying the curable organopolysiloxane elastomer to the primed metal surface and then heating the resulting article under the conditions required to cure the silicone elastomer. With the rapid curing organopolysiloxane elastomers of my aforementioned copending application Ser. No. 227,081, this curing can be effected in a press at a temperature of about 150° C. for a time of about 10 minutes. During this time, the rapid curing organopolysiloxane elastomer is cured to a silicone rubber which is firmly bonded to the metallic base through the primer composition of the present invention. The bond between the base and the cured silicone rubber is so strong that even after exposure of the composite article to type A automatic transmission fluid for 200 hours at 300° F., the bond between the silicone rubber and the metal base is stronger than the silicone rubber itself, which retains the major portion of its original strength under these conditions.

The following examples are illustrative of the practice of my invention and are not intended for purposes of limitation.

The adhesion test referred to in the examples was conducted by applying the compositions referred to in the example to the metal portion of an automotive transmission seal by dipping the metal portion into a solution of the composition. The metal portion is removed, the excess solution is allowed to flow off and the metal component is dried for 15 minutes at room temperature to remove solvent, resulting in a solid film of the coating composition on the metal surface. The metal component is then placed in a mold where silicone rubber is molded to its surface employing a temperature of 150° C. for a time of 10 minutes. At the end of this time, the metal part is placed in type A automatic transmission fluid for 200 hours at 300° F. At the end of this time, the part is cooled and an attempt is made to pull the cured silicone rubber from the metal surface. This results either in the peeling of the silicone rubber from the metal surface or the rupture of the silicone rubber. The bonding agent is considered to have failed if the silicone rubber peels from the metal part.

The silicone rubber employed in the examples was a methylvinylpolysiloxane of the type described in Example 1 of my aforementioned copending application. More particularly, this material comprised 61.6 parts of a methylvinylpolysiloxane gum, 23.6 parts of fumed silica, 37 parts of heat expanded and ground natural silica, 1.8 parts iron oxide, 5.5 parts of a methoxy chain-stopped copolymer of dimethylsiloxane units and diphenylsiloxane units and 0.6 part of vinyltriethoxysilane.

*Example 1*

In this example, a number of primer compositions within the scope of the present invention were prepared from vinyl tris(2-methoxyethoxy) silane, phosphorous acid, and various solvents. The table below lists the formulations employed.

TABLE I

| Run No. | 1 | 2 | 3 | 4 | 5 | 6 | 7 | 8 | 9 |
|---|---|---|---|---|---|---|---|---|---|
| Vinyl tris(2-methoxyethoxy) Silane | 100 | 100 | 100 | 100 | 100 | 100 | 100 | 100 | 100 |
| Phosphorous Acid | 2.5 | 0.5 | 1.5 | 2.5 | 10 | 2.5 | 2.5 | 2.5 | 2.5 |
| Isopropanol | 300 | 700 | 700 | 700 | 110 | 300 | 300 | | |
| Methanol | | | | | | 800 | | | |
| 1,1,1-trichloroethane | | | | | | | 800 | 400 | |
| Butyl Acetate | | | | | | | | | 400 |

When all of the compositions described in the table were applied to the metallic transmission seal member described above and the silicone rubber was bonded thereto, each of the transmission seals passed the above-described adhesion test. When the procedure of Run No. 1 was repeated except that 2.5 parts of either phosphoric acid, concentrated sulfuric acid or maleic acid was substituted for the phosphorous acid, the transmission seals failed the adhesion test. Likewise, when the procedure of this example was repeated with the composition of Run No. 1 having ethyltriethoxysilane in place of the vinyl tris(2-methoxyethoxy) silane, the transmission seal again failed in the adhesion test.

*Example 2*

In this example, a number of compositions within the scope of the present invention were prepared from vinyltriethoxysilane, phosphorous acid and isopropanol. The table below lists the various formulations.

TABLE II

| Run No. | 10 | 11 | 12 | 13 | 14 |
|---|---|---|---|---|---|
| Vinyltriethoxysilane | 100 | 100 | 100 | 100 | 100 |
| Phosphorous Acid | 0.5 | 3.0 | 1.5 | 2.5 | 2.5 |
| Isopropanol | 300 | 300 | 300 | 100 | 1000 |

Following the procedure described above, automatic transmission seals were prepared and the adhesion test was performed. In all cases, rupture occurred in the body of the silicone rubber coating, thereby showing that the compositions passed the adhesion test.

*Example 3*

This example illustrates compositions within the scope of the present invention in which a portion of the alkenyl tris(organoxy) silane is replaced by the partial hydrolyzate of an alkyl orthosilicate. More particularly, the compositions of this example comprised vinyl tris(2-methoxyethoxy) silane, Ethyl Silicate 40, phosphorous acid and isopropanol in the proportions by weight shown by Table III which follows.

TABLE III

| Run No. | 15 | 16 | 17 | 18 |
|---|---|---|---|---|
| Vinyl tris(2-methoxyethoxy) Silane | 10 | 30 | 70 | 90 |
| Ethyl Silicate 40 | 90 | 70 | 30 | 10 |
| Phosphorous Acid | 2.5 | 2.5 | 2.5 | 2.5 |
| Isopropanol | 200 | 200 | 200 | 200 |

The ingredients were merely mixed together, used to prime the metallic portion of an automotive transmission seal, the silicone rubber portion was molded to the metallic portion as was done in the preceding examples, and the adhesion test was performed. In all of the cases of Runs 15 through 18, satisfactory adhesion was obtained. When, however, instead of employing the mixture including the vinyl tris(2-methoxyethoxy) silane, 100 parts of Ethyl Silicate 40 were mixed with 2.5 parts phosphorous acid and 200 parts isopropanol and the procedure was repeated, the silicone rubber peeled from the surface of the metallic part, indicating a failure.

While the foregoing examples have illustrated a number of embodiments of my invention, it should be noted that the invention is directed generally to the use of bonding compositions comprising as essential ingredients an alkenyl tris(organoxy) silane within the scope of Formula 1 and phosphorous acid, preferably in the proportions previously recited. It should be understood that the compositions of the present invention can contain a mixture of more than one alkenyl tris(organoxy) silane. Likewise, a portion of the alkenyl tris(organoxy) silane can be replaced with an orthosilicate of the scope defined by Formula 2 or mixtures of such orthosilicates. The primers of the present invention are particularly useful for the bonding of rapidly curing silicone rubber to metallic surfaces, such as surfaces of iron, cobalt, nickel, aluminum, as well as various ferrous alloys.

While the compositions of the present invention have been described in terms of their use in bonding rapid curing organopolysiloxanes to metallic substrates, these compositions are unique in that they are also useful for adhering a wide variety of silicone elastomers to a wide variety of substrates.

Without attempting to limit the type of organopolysiloxanes which can be used with the compositions of the present invention, it can be pointed out that these elastomers include the more conventional organopolysiloxane elastomers such as those described in Patents 2,448,756, Agens, 2,445,794, Marsden, and 2,883,366, Kantor. In addition other useful elastomers include the newer room temperature vulcanizing elastomers such as those described in Patent 2,843,555, Berridge, and such as those described in French Patents 1,198,749, 1,188,495 and French addition Patents 74,579, 74,580 and 76,483. Among the substrates to which the primer adheres are the metallic substrates described above as well as nonmetallic substrates such as glass, other ceramic materials, masonry and the like.

The technique involved in the application of the compositions of the present invention to non-metallic surfaces is identical to that involved in applying the compositions to metallic substrates. For example, the composition of Run No. 16 of Example 3 is sprayed onto a glass surface and allowed to dry for 15 minutes in air at room temperature. A layer of room temperature vulcanizing silicone rubber prepared by the process of Example 1 of Patent 2,843,555 is applied to the primed glass surface and allowed to stand at room temperature for 24 hours. The resulting composite article of glass and silicone rubber is bonded so well that the rubber ruptures before the bond between the rubber and the glass is broken.

What I claim as new and desire to secure by Letters Patent of the United States is:

1. A composition comprising the product obtained by mixing (A) 100 parts by weight of an alkenyl tris(organoxy) silane having the formula:

$$RSi(OR')_3$$

(B) from 0.5 to 15 parts by weight of phosphorous acid, and (C) from 100 to 2,000 parts by weight of a polar solvent capable of dissolving said silane and said acid, where R is an alkenyl radical and R' is a member selected from the class consisting of monovalent hydrocarbon radicals and substituted monovalent hydrocarbon radicals.

2. A primer composition for improving the adhesion of silicone rubber to solid substrates comprising the product obtained by mixing 100 parts by weight of an alkenyl tris(organoxy) silane having the formula:

$$RSi(OR')_3$$

from 0.5 to 15 parts by weight of phosphorous acid, and from 100 to 2,000 parts by weight of a polar solvent capable of dissolving said silane and said acid and selected from the class consisting of alkanols, halogenated alkanes, and esters, where R is an alkenyl radical and R' is a member selected from the class consisting of monovalent hydrocarbon radicals substituted monovalent hydrocarbon radicals.

3. A primer composition useful in improving the adhesion of silicone rubber to various surfaces comprising the product obtained by mixing 100 parts by weight of an alkenyl tris(organoxy) silane having the formula:

$$RSi(OR')_3$$

from 0.5 to 15 parts by weight of phosphorous acid and from 100 to 2,000 parts by weight of a polar solvent capable of dissolving said silane and said acid and being selected from the class consisting of methanol, ethanol, n-propanol, isopropanol, isobutanol, perchloroethylene, 1,1,1-trichloroethylene, butyl acetate, methyl propionate, and ethyl acetate, where R is an alkenyl radical and R' is a member selected from the class consisting of hydrocarbon radicals and substituted monovalent hydrocarbon radicals.

4. A primer composition comprising (A) 100 parts by weight of a mixture of an alkenyl tris(organoxy) silane having the formula $RSi(OR')_3$, and a silicate selected from the class consisting of alkyl orthosilicates, hydroxyalkyl orthosilicates, partial hydrolyzates of alkyl orthosilicates, and partial hydrolyzates of hydroxyalkyl orthosilicates, said silane comprising on a weight basis at least 10% of the weight of the mixture of said silane and said silicate, (B) from 0.5 to 15 parts by weight of phosphorous acid, (C) and from 100 to 2,000 parts by weight of a polar solvent capable of dissolving said silane and said acid, where R is an alkenyl radical and R' is a member selected from the class consisting of monovalent hydrocarbon radicals and substituted monovalent hydrocarbon radicals.

5. A composition useful for improving the adhesion of a silicone rubber to a substrate which comprises, by weight, (A) 100 parts of a mixture of a vinyl tris(organoxy) silane having the formula:

$$RSi(OR')_3$$

and a silicate selected from the class consisting of an alkyl orthosilicate, a hydroxyalkyl orthosilicate, a partial hydrolysis product of an alkyl orthosilicate and a partial hydrolyzate of a hydroxyalkyl orthosilicate, said silane comprising on a weight basis at least 10% of the weight of the mixture of said silane and said silicate, (B) from 0.5 to 15 parts phosphorous acid, and (C) from 100 to 2,000 parts by weight of a polar solvent capable of dissolving said silane and said acid, and selected from the class consisting of alkanols, halogenated alkanes, and esters, where R is an alkenyl radical and R' is a member selected from the class consisting of monovalent hydrocarbon radicals and substituted monovalent hydrocarbon radicals.

6. A composition of claim 3 in which said silane is vinyl tris(2-methoxyethoxy) silane.

7. A composition of claim 3 in which said silane is vinyltriethoxysilane.

8. A composition of claim 4 in which said solvent is a member selected from the class consisting of methanol, ethanol, n-propanol, isopropanol, isobutanol, perchloroethylene, 1,1,1-trichloroethylene, butyl acetate, methyl propionate, and ethyl acetate.

9. A composition of claim 4 in which said silane is vinyl tris(2-methoxyethoxy) silane in which said silicate is a partial hydrolyzate of ethyl orthosilicate.

References Cited by the Examiner

UNITED STATES PATENTS 3,024,131   3/1962   Hutchinson _____ 117—75
3,062,242   11/1962   Vanderbilt _____ 260—448.8

MORRIS LIEBMAN, *Primary Examiner.*

A. LIEBERMAN, *Assistant Examiner.*